United States Patent
Kim et al.

(10) Patent No.: US 9,664,990 B2
(45) Date of Patent: May 30, 2017

(54) ILLUMINATION APPARATUS AND PROJECTION-TYPE IMAGE DISPLAY APPARATUS HAVING THE SAME

(71) Applicant: SAMSUNG ELECTRONICS CO., LTD., Suwon-si (KR)

(72) Inventors: Sung-tae Kim, Seoul (KR); Yong-Dok Cha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 14/694,643

(22) Filed: Apr. 23, 2015

(65) Prior Publication Data

US 2015/0309399 A1 Oct. 29, 2015

(30) Foreign Application Priority Data

Apr. 24, 2014 (KR) .......................... 10-2014-0049475

(51) Int. Cl.
| | |
|---|---|
| *G03B 21/20* | (2006.01) |
| *F21V 13/14* | (2006.01) |
| *F21V 33/00* | (2006.01) |
| *G02B 27/14* | (2006.01) |
| *G02B 26/00* | (2006.01) |

(Continued)

(52) U.S. Cl.
CPC .............. *G03B 21/204* (2013.01); *F21K 9/64* (2016.08); *F21V 13/14* (2013.01); *F21V 33/0052* (2013.01); *G02B 26/008* (2013.01); *G02B 27/141* (2013.01); *G03B 21/208* (2013.01); *F21W 2131/40* (2013.01); *F21Y 2101/00* (2013.01); *F21Y 2115/30* (2016.08);
(Continued)

(58) Field of Classification Search
CPC G03B 21/204; G03B 21/208; G03B 21/2033; G03B 21/2066; H04N 9/3152; H04N 9/3158; H04N 9/3161; H04N 9/3164
See application file for complete search history.

(56) References Cited

U.S. PATENT DOCUMENTS 8,894,241 B2 11/2014 Kitano
2003/0039036 A1* 2/2003 Kruschwitz ........ G02B 27/0927
359/707
(Continued)

FOREIGN PATENT DOCUMENTS

| JP | 6-20925 A | 1/1994 |
|---|---|---|
| JP | 2013-092752 A | 5/2013 |

(Continued)

OTHER PUBLICATIONS

Communication dated May 10, 2016, issued by European Patent Office in counterpart European Patent Application No. 15164135.4.
(Continued)

*Primary Examiner* — Sultan Chowdhury
(74) *Attorney, Agent, or Firm* — Sughrue Mion, PLLC

(57) ABSTRACT

An illumination apparatus is provided, including a light source unit which includes at least one laser diode emitting light of a single color; a diffuser plate which disperses the light emitted from the light source unit; a fly-eye lens array which transmits light dispersed by the diffuser plate; and a fluorescent unit on which light transmitted by the fly-eye lens array is incident and which emits white light.

11 Claims, 8 Drawing Sheets

(51) Int. Cl.
  *F21K 9/64* (2016.01)
  *G02B 5/02* (2006.01)
  *F21W 131/40* (2006.01)
  *F21Y 101/00* (2016.01)
  *F21Y 115/30* (2016.01)

(52) U.S. Cl.
  CPC ........ *G02B 5/0278* (2013.01); *G03B 21/2013* (2013.01); *G03B 21/2066* (2013.01)

(56) References Cited

U.S. PATENT DOCUMENTS

| | | | |
|---|---|---|---|
| 2012/0300178 A1* | 11/2012 | Sugiyama | H04N 9/3111 353/31 |
| 2013/0021582 A1 | 1/2013 | Fujita et al. | |
| 2013/0222772 A1 | 8/2013 | Matsubara | |
| 2013/0229628 A1 | 9/2013 | Akiyama et al. | |
| 2014/0125956 A1 | 5/2014 | Chifu et al. | |
| 2015/0219984 A1 | 8/2015 | Matsubara | |
| 2015/0323156 A1* | 11/2015 | Miyoshi | G01N 21/645 362/84 |
| 2015/0323861 A1* | 11/2015 | Saitou | G03B 21/2013 353/31 |
| 2016/0088273 A1* | 3/2016 | Fukui | G03B 21/204 353/31 |

FOREIGN PATENT DOCUMENTS

| | | |
|---|---|---|
| JP | 2013-120250 A | 6/2013 |
| WO | 2013/008323 A1 | 1/2013 |
| WO | 2014/041636 A1 | 3/2014 |

OTHER PUBLICATIONS

Communication dated Dec. 1, 2015 issued by European Patent Office in counterpart European Patent Application No. 15164135.4.

* cited by examiner

ILLUMINATION APPARATUS AND PROJECTION-TYPE IMAGE DISPLAY APPARATUS HAVING THE SAME

CROSS-REFERENCE TO RELATED APPLICATION

This application claims priority from Korean Patent Application No. 10-2014-0049475 filed Apr. 24, 2014 in the Korean Intellectual Property Office, the disclosure of which is incorporated herein by reference in its entirety.

BACKGROUND

1. Field

Apparatuses consistent with exemplary embodiments relate to an illumination apparatus of a projection-type image display apparatus, and more particularly, to an illumination apparatus using laser diodes as a light source and a projection-type image display apparatus using the same.

2. Description of the Related Art

In general, light emitting diodes (LEDs) are widely used as light sources for illumination apparatus used in projection-type image display apparatuses, such as projectors. However, since rays coming from a light emitting diode are widely spread, there needs to be an optical device, such as one or more lenses, for collecting the dispersed rays, however, this is difficult.

Also, the larger the screen of a display is, the brighter the illumination apparatus must be. Thus, an illumination apparatus using light emitting diodes as a light source needs would need to increase the output of the light emitting diodes in order to increase brightness. This could require the development of new, higher output, light emitting diodes.

Alternately, as another way to increase the brightness of an illumination apparatus, laser diodes may be used, rather than light emitting diodes, as a light source. In this case, as a laser diode has better light linearity than a light emitting diode with the same power, an illumination apparatus using laser diodes can emit brighter light than an illumination apparatus using light emitting diodes.

However, in order to use laser diodes in an image display apparatus with a large screen, the output light amount of a laser diode light source needs to be increased. As one way to increase the light amount output by a laser diode light source, a power of the laser diode itself may be increased. However, while increasing the power of a laser diode increases the light amount, it also increases the heat that is generated, which means that the cooling of the light source must also be taken into consideration. When a cooling apparatus is used, there is the additional problem that the overall size of the illumination apparatus is increased, and, therefore, the structure thereof becomes more complicated.

As another way to increase the brightness of an illumination apparatus, the number of laser diodes used in the light source may be increased. However, increasing the number of laser diodes used also increases the heat that is generated, so there is still an issue of the need for a cooling apparatus. Accordingly, there is also an issue of an increased size of the illumination apparatus and more complicated structure thereof.

Therefore, without increasing the number of the laser diodes or increasing the power of the laser diodes themselves, there should be a way to increase the light amount of an illumination apparatus using laser diodes as a light source.

SUMMARY

One or more exemplary embodiments described herein may have been developed in order to overcome one or more the above drawbacks and other problems associated with the above-described arrangements. One or more exemplary embodiments may therefore relate to an illumination apparatus which can provide a greater amount of light than a related art apparatus even when conventional laser diodes are used and the number of laser diodes is not increased, and a projection-type image display apparatus using the same.

An aspect of an exemplary embodiment provides an illumination apparatus, which may include a light source unit configured to emit laser light of a single color using at least one laser diode; a diffuser plate configured to disperse the laser light emitted from the light source unit; a fly-eye lens configured to form light transmitted by the diffuser plate into uniform light; and a fluorescent unit, disposed such that light transmitted by the fly-eye lens is incident thereon, and configured to emit white light.

The light source unit may include a first diode array including a first plurality of laser diodes; a second diode array disposed perpendicular to the first diode array and including a second plurality of laser diodes; a first mirror disposed between the first diode array and the second diode array, wherein the first mirror transmits light emitted from the first diode array and reflects light emitted from the second diode array; a convex lens configured to form a plurality of light rays, transmitted through the first mirror or reflected by the first mirror and then converted into a single light ray, by a condenser lens, for example; and a second mirror which reflects light transmitted by the convex lens, toward the diffuser plate.

The image forming apparatus may include a plurality of first collimator lenses, each of the plurality of first collimator lenses disposed in front of one of the first plurality of laser diodes and the second plurality of laser diodes.

Each of the first plurality of laser diodes and the second plurality of laser diodes may include a blue laser diode which emits blue light.

The diffuser plate may include a glass diffuser plate.

The fluorescent unit may include a dichroic mirror which reflects light transmitted through the fly-eye lens; a second collimator lens which collimates light reflected by the dichroic mirror; a fluorescent wheel, rotatably disposed in an optical path of light transmitted by the second collimator lens, wherein the fluorescent wheel transmits light transmitted through the second collimator lens or absorbs light transmitted through the second collimator lens and emits fluorescent light toward the second collimator lens; and a reflective optical path which guides light, transmitted through the fluorescent wheel, toward the dichroic mirror.

The fluorescent wheel may include a rotating disk-shaped substrate; a fluorescent layer formed on one surface of the rotating substrate; and a motor to rotate the rotating substrate, wherein the fluorescent layer includes a red fluorescent portion, a green fluorescent portion, and a transparent portion arranged in a circumferential direction on the rotating substrate, and wherein light emitted from the red fluorescent portion and from the green fluorescent portion is transmitted through the second collimator lens, is transmitted through the dichroic mirror, and is emitted to an outside of the fluorescent unit, and light transmitted through the transparent portion is transmitted through the reflective optical path and then is reflected by the dichroic mirror to the outside of the fluorescent unit.

The illumination apparatus may further include a fluorescent diffuser disposed on the fluorescent reflection layer of the fluorescent wheel.

The reflective optical path may include a third collimator lens which collimates light transmitted and emitted by the fluorescent wheel; a first reflective mirror which reflects light transmitted by the third collimator lens; a condenser lens which transmits light reflected by the first reflective mirror; a second reflective mirror which reflects light transmitted through the condenser lens; and a third reflective mirror which reflects light reflected by the second reflective mirror, toward the dichroic mirror.

The illumination apparatus may include a prism unit which guides from the fluorescent unit toward an image forming unit, wherein the prism unit may include an image fly-eye lens to form the light coming out of the fluorescent unit in a shape corresponding to the image forming unit; a first relay lens which transmits light transmitted by the image fly-eye lens; a reflective mirror which reflects light transmitted by the first relay lens; a second relay lens which transmits light reflected by the reflective mirror; and a total reflection prism which totally internally reflects light transmitted through the second relay lens, toward the image forming unit, wherein the light reflected by the image forming unit is emitted to an outside of the apparatus through the total reflection prism.

According to an aspect of another exemplary embodiment, a projection-type image display apparatus may include an illumination apparatus configured to emit laser light and having at least one of the features as described above; an image forming unit configured to emit image light using the laser light emitted from the illumination apparatus; and a projection unit configured to project the image light coming out of the image forming unit onto a screen.

Other exemplary objects, advantages and salient features of exemplary will become apparent from the following detailed description, which, taken in conjunction with the annexed drawings.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

Throughout the drawings, like reference numerals should be understood to refer to like parts, components and structures.

DETAILED DESCRIPTION

Hereinafter, certain exemplary embodiments will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments.

Figure 1:
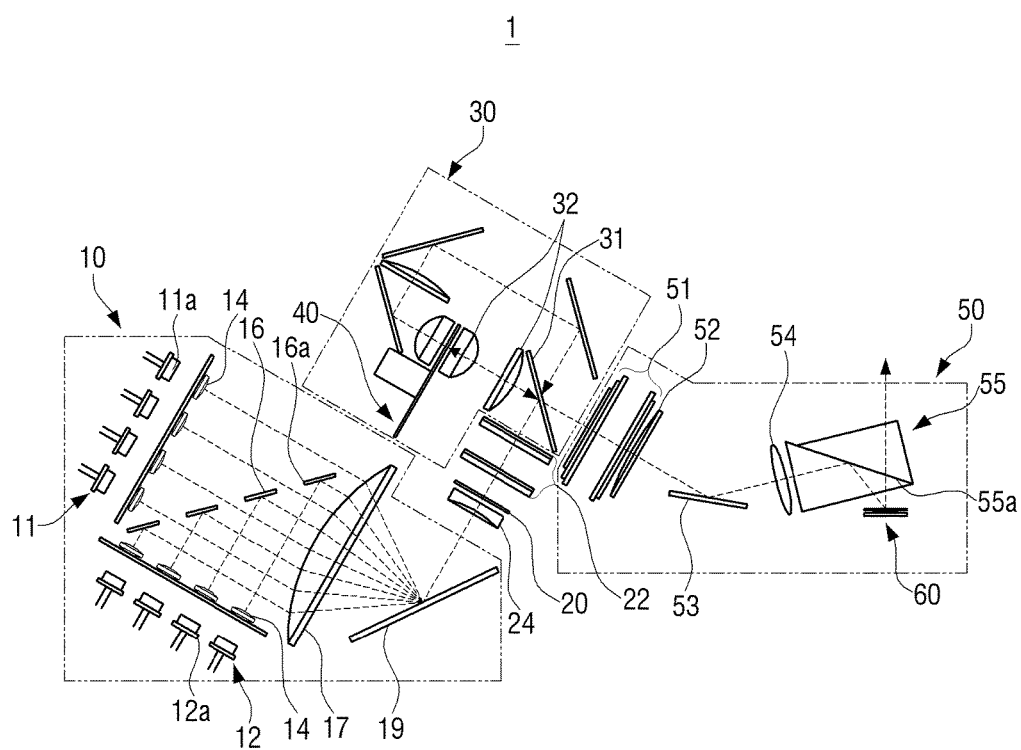
FIG. 1 is a conceptual view of a structure of an illumination apparatus according to an exemplary embodiment.
Figure 2:
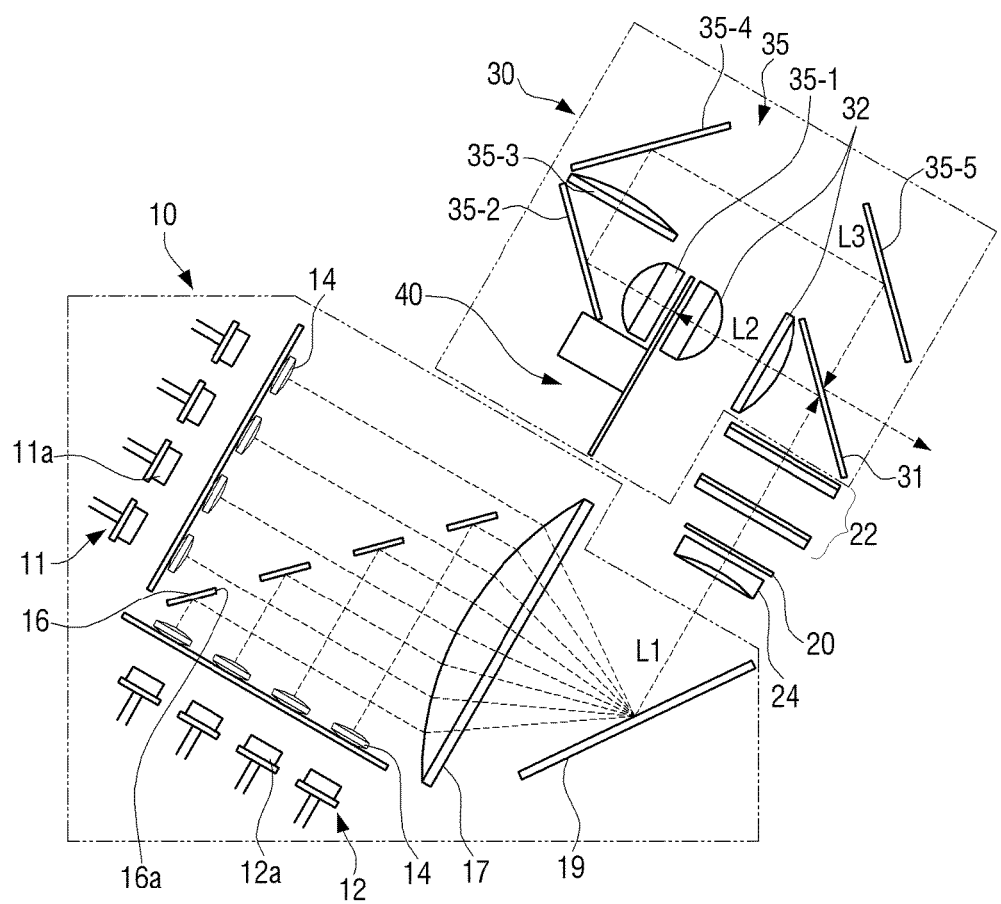
FIG. 2 is a view in which a fluorescent unit of the illumination apparatus of FIG. 1 generates blue light.
Figure 3:
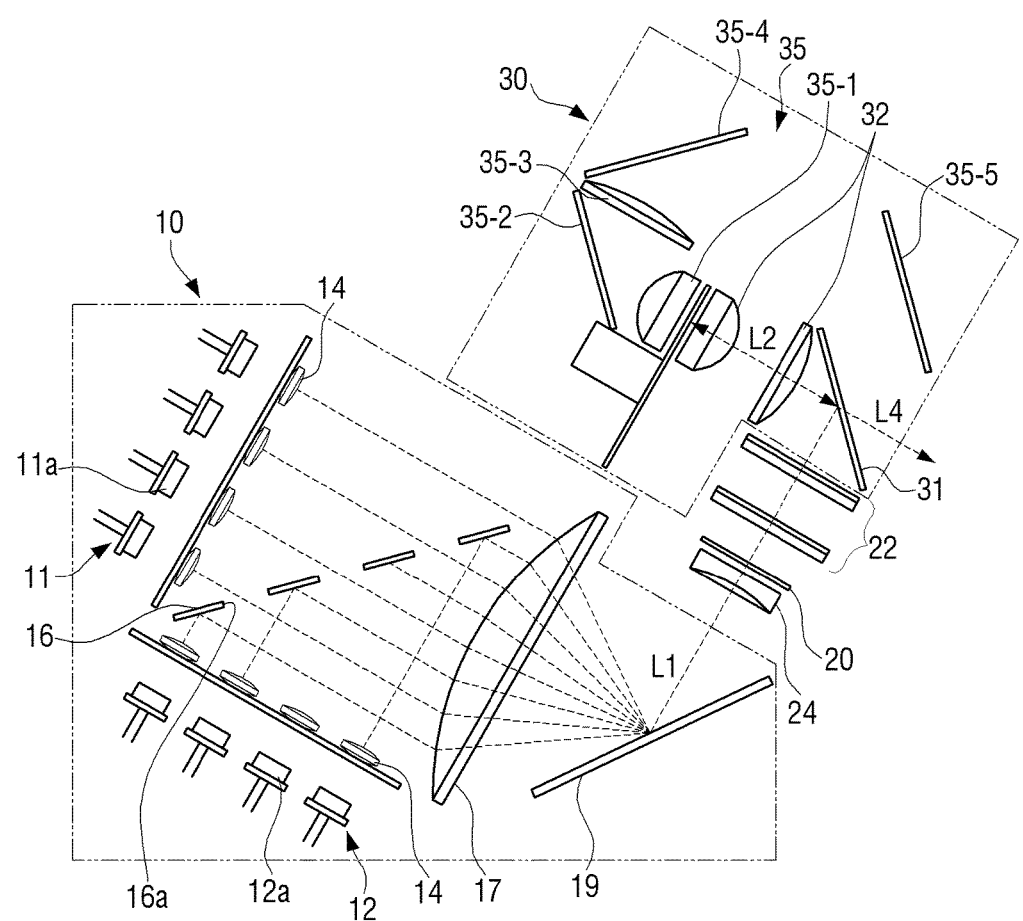
FIG. 3 is a view in which a fluorescent unit of the illumination apparatus of FIG. 1 generates red light or green light.
Figure 4:
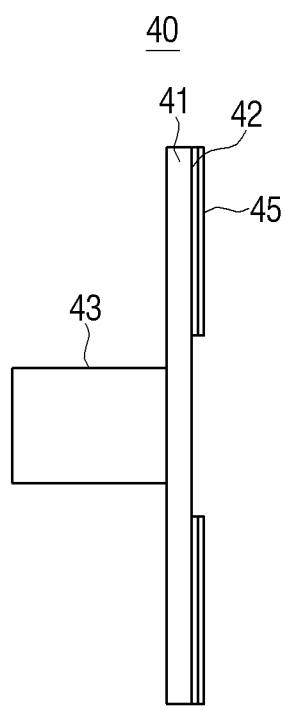
FIG. 4 is a cross-sectional view of a fluorescent wheel that is used in a fluorescent unit of the illumination apparatus of FIG. 1.
Figure 5:
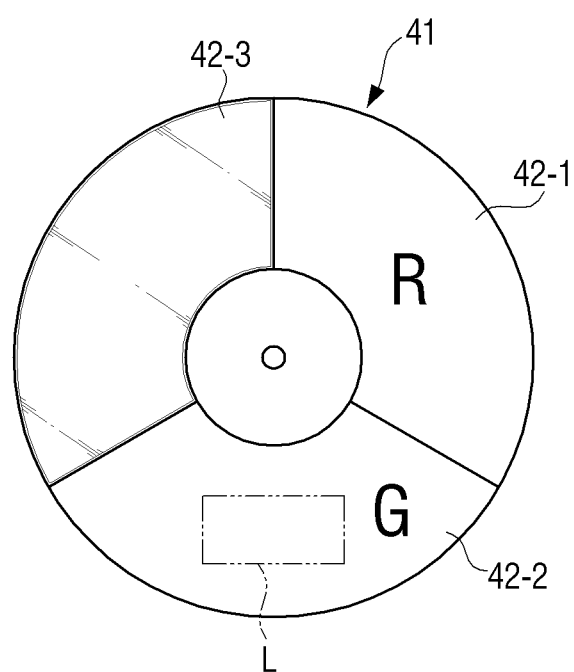
FIG. 5 is a front view of a fluorescent wheel that is used in a fluorescent unit of the illumination apparatus of FIG. 1.

FIG. 1 is a conceptual view of a structure of an illumination apparatus according to an exemplary embodiment. FIG. 2 is a view of a case in which a fluorescent unit of the illumination apparatus of FIG. 1 generates blue light, and FIG. 3 is a view of a case in which a fluorescent unit of the illumination apparatus of FIG. 1 generates red light or green light. FIG. 4 is a cross-sectional view of a fluorescent wheel used in a fluorescent unit of the illumination apparatus of FIG. 1, and FIG. 5 is a front view of a fluorescent wheel used in a fluorescent unit of the illumination apparatus of FIG. 1.

Referring to FIG. 1, an illumination apparatus 1, according to an embodiment, may include a light source unit 10, a fluorescent unit 30, and a prism unit 50.

The light source unit 10 is configured to emit laser light of a single color using laser diodes 11a and 12a. To this end, the light source unit 10 may include a plurality of laser diodes 11a and 12a, a first mirror 16, a convex lens 17, and a second mirror 19.

The plurality of laser diodes 11a and 12a may consist of a first diode array 11 and a second diode array 12 that are arranged perpendicular to each other. Each of the first and second diode arrays 11 and 12 may be arranged in an M×N matrix form. In FIGS. 1, 2, and 3, only four laser diodes 11a and four laser diodes 12a are illustrated in f the first and second diode arrays 11 and 12, respectively. However, each array 11 and 12 may also include laser diodes arranged in of N columns in a direction perpendicular to the page of the drawings. For example, the first diode array 11 may consist of 4×10 laser diodes 11a, and the second diode array 12 also may consist of 4×10 laser diodes 12a. The first diode array 11 and the second diode array 12 may be arranged perpendicular to each other.

A first collimator lens 14 may be disposed in front of each of the plurality of laser diodes 11a and 12a of the first and second diode arrays 11 and 12. The first collimator lens 14 collects the light output by the respective laser diode and collimates the light to output parallel laser light. Laser diodes emitting light of different colors may be used as the laser diodes 11a and 12a. However, in the present embodiment, blue laser diodes that emit blue light are used as the laser diodes 11a and 12a.

The first mirror 16 is disposed between the first diode array 11 and the second diode array 12. In detail, the first mirror 16 is disposed at an angle of approximately 45 degrees with respect to each of the first diode array 11 and the second diode array 12. The first mirror 16 directs the laser light emitted from the plurality of laser diodes 11a and 12a of the first and second diode arrays 11 and 12 to the convex lens 17 by transmitting the laser light emitted from the plurality of laser diodes 11a of the first diode array 11 and by reflecting the laser light emitted from the plurality of laser diodes 12a of the second diode array 12. Accordingly, the first mirror 16 may include a plurality of holes 16a corresponding to areas of the mirror 16 on which light from the plurality of laser diodes 11a of the first diode array 11 would otherwise be incident. Alternately, the mirror 16 may be a half-silvered mirror, or another type of beamsplitter device as would be understood by one of skill in the art.

Light transmitted by and reflected by the first mirror 16 is incident on the convex lens 17 which transmits the light incident thereon to a second mirror 19.

The second mirror 19 reflects the light transmitted by the convex lens 17 toward the fluorescent unit 30.

In order to minimize loss of the light moving from the light source unit 10 to the fluorescent unit 30, a diffuser plate 20 and a fly-eye lens 22 are disposed between the light source unit 10 and the fluorescent unit 30. Accordingly, the light reflected by the second mirror 19 of the light source unit 10 is incident on the diffuser plate 20. The diffuser plate 20 disperses the light L1, which is the light output by the light plurality emitted from the plurality of laser diodes 11a and 12a of the light source unit 10, focused by the convex lens 17, and reflected from the second mirror 19. The diffusion of the light by the diffuser plate 20 improves the light uniformity, and allows the light to pass through the fly-eye lens 22, thereby further improving the light uniformity. The diffuser plate 20 may be a glass diffuser plate. A first condenser lens 24 may be disposed upstream of the diffuser plate 20, in a light traveling direction, to collect the light that is reflected by the second mirror 19 and is then incident on the diffuser plate 20.

The fly-eye lens 22 is disposed downstream of the diffuser plate 80, in the light traveling direction, and the light transmitted by the fly-eye lens 22 is formed into uniform light having a predetermined shape such as, for example, a quadrangle shape, a rectangular shape, etc. The light transmitted by the fly-eye lens 22 has a greater uniformity than the light incident on the fly-eye lens 22. The fly-eye lens 22 may actually include two fly-eye lenses. As illustrated in FIGS. 1 to 3, the fly-eye lens 22 used in the illumination apparatus 1 according to an exemplary embodiment includes two fly-eye lenses that are spaced apart by a predetermined distance from. Accordingly, the uniform light having the predetermined shape that is emitted from the fly-eye lens 22 is incident onto a dichroic mirror 31 of the fluorescent unit 30.

Figure 7A:
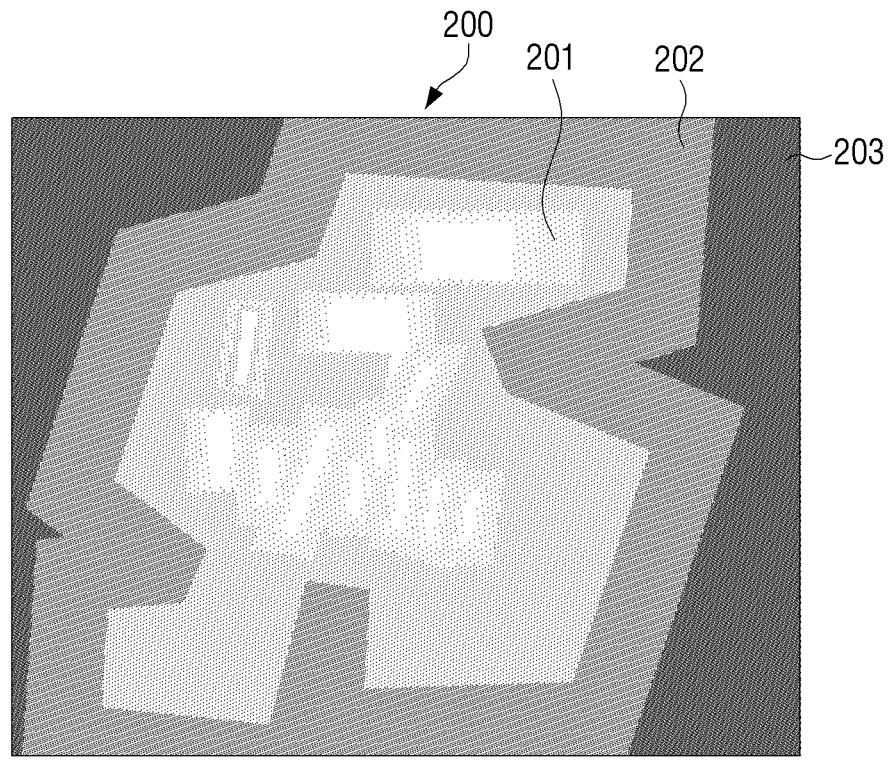
FIG. 7A is a view of a light spot formed in a fluorescent unit when the illumination apparatus of FIG. 1 includes a fly-eye lens without a diffuser plate.
Figure 7B:
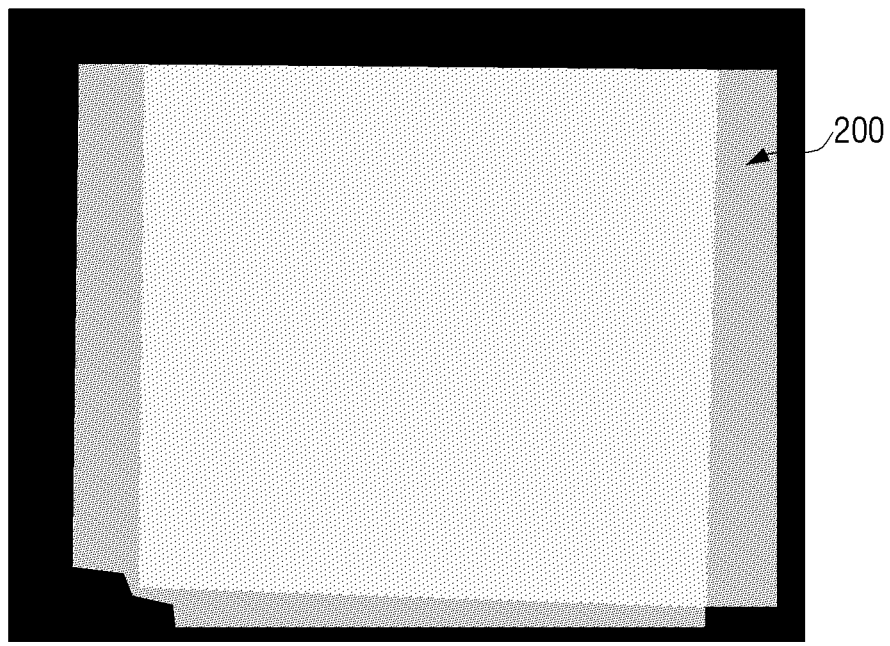
FIG. 7B is a view of a light spot formed in a fluorescent unit when the illumination apparatus includes both a diffuser plate and a fly-eye lens, as illustrated in FIG. 1.

If the fluorescent unit 30 were to include only the fly-eye lens 22, and not the diffuser plate 20, between the mirror 19 and the mirror 31, unlike in the current exemplary embodiment, the light emitted from the light source unit 10 would not be diffused, and would therefore be less uniform. As a result, a resultant light spot 200 (see FIGS. 7A and 7B) formed in the fluorescent unit 30, specifically, on a fluorescent wheel 40 of the fluorescent unit 30 as will be described later, would be distorted as illustrated in FIG. 7A, thus causing energy loss. In FIG. 7A, the reference numeral 201 represents a central, brightest part of the light spot 200, and the reference numeral 202 denotes in intermediate, bright part of the light spot 200, in a region at the perimeter of the central, brightest part 201, and the reference numeral 203 represents the outer, darkest part of the light spot 200, in a region at the perimeter of the intermediary, bright part 202. Accordingly, if the diffuser plate 20 is not used, it can be seen that each of the parts 201, 202, and 203 of the light spot 200 forms a non-uniform, irregular shape as illustrated in FIG. 7A. However, if the diffuser plate 20 and the fly-eye lens 22 are sequentially disposed between the mirror 19 and the other elements of the fluorescent unit 30, as described with respect to the above exemplary embodiment, the diffuser plate 20 scatters the light emitted from the light source unit 10, and the diffuse light is incident on the fly-eye lens 22 which outputs light which creates a substantially uniform light spot 200 on the fluorescent wheel 40 of the fluorescent unit 30, the light spot 200 having a substantially rectangular shape as illustrated in FIG. 7B. Accordingly, when laser light sources are used in the light source unit 10, both the diffuser plate 20 and the fly-eye lens 22 may be used to form a uniform light spot on the fluorescent wheel 40 of the fluorescent unit 30.

The fluorescent unit 30 is configured to receive the laser light of a single color emitted from the light source unit 10, and to emit white light. For example, in the present exemplary embodiment, the fluorescent unit 30 transforms the light emitted from the blue laser diodes into blue light, red light, and green light, and then emits the blue, red, and green light, such that the combined light emitted from the fluorescent unit 30 is white light. The fluorescent unit 30 may include a dichroic mirror 31, a fluorescent wheel 40, and elements of a reflective optical path 35.

The dichroic mirror 31 is configured, as would be understood by one of skill in the art, to reflect light having a predetermined wavelength and to transmit light having any wavelength other than the predetermined wavelength. In the present exemplary embodiment, the dichroic mirror 31 is configured to reflect the blue light, and to allow red and green to be transmitted therethrough 31. Accordingly, since the light emitted from the light source unit 10 is blue light, the light L2, transmitted through the diffuser plate 20 and the fly-eye lens 22, is reflected by the dichroic mirror 31, and then is incident toward the fluorescent wheel 40.

A second collimator lens 32 is disposed between the dichroic mirror 31 and the fluorescent wheel 40. The second collimator lens 32 collimates the light reflected from the dichroic mirror 31, and thereby outputs parallel light. In the present exemplary embodiment, two second collimator lenses 32 are disposed between the dichroic mirror 31 and the fluorescent wheel 40. However, the number of second collimator lens 32 is not limited by this. One collimator lens or three or more collimator lenses may be used as long as they collimate the light reflected from the dichroic mirror 31, and direct the collimated light to be incident on the fluorescent unit 30.

The blue light is incident on the fluorescent wheel 40, and the fluorescent wheel transforms the incident blue light into red light and green light. The fluorescent wheel 40 is rotatably disposed in an optical path through which the light, that has been transmitted by the second collimator lens 32, passes. The fluorescent wheel 40 is configured such that energy of the light incident on the fluorescent wheel 40 is either absorbed by the fluorescent wheel 40 and emitted as light of a different color, or is transmitted through the fluorescent wheel 40.

Referring to FIG. 4, the fluorescent wheel 40 may include a rotating substrate 41, a fluorescent layer 42, formed on one surface of the rotating substrate 41, and a motor 43 for rotating the rotating substrate 41.

As illustrated in FIG. 5, the rotating substrate 41 is formed in the shape of a disk, and is rotated in one direction by the motor 43. The rotating substrate 41 may be formed of a transparent material through which the blue light can pass.

The fluorescent layer 42 is formed to have a predetermined width in a circumferential direction on the one surface of the rotating substrate 41, namely, on the surface facing the dichroic mirror 31. In other words, the fluorescent layer 42 is formed in a donut shape on the one surface of the rotating substrate 41. The fluorescent layer 42 may be formed by coating the rotating substrate 41.

The fluorescent layer 42 may include a red fluorescent portion 42-1, a green fluorescent portion 42-2, and a transparent portion 42-3, sequentially formed. The red fluorescent portion 42-1 is formed by coating a fluorescent material, which is excited to emit red light by a collision with the blue laser light, on the rotating substrate 41. The green fluorescent portion 42-2 is formed by coating a fluorescent material, which is excited to emit green light by a collision with the blue laser light, on the rotating substrate 41. In the above description, the red fluorescent portion 42-1 and the green fluorescent portion 42-2 are formed by coating the fluorescent material on the rotating substrate 41. However, this is only one example; therefore, the fluorescent material may be attached to the rotating substrate 41 by any of a variety of methods such as spraying, vapor deposition, or the like. The transparent portion 42-3 is not coated by any material, and the transparent rotating substrate 41 is therefore exposed to the incident light. Accordingly, the light incident on the fluorescent wheel 40 can pass through the transparent portion 42-3.

As illustrated in FIG. 4, a diffuser 45 may be disposed on the fluorescent layer 42 of the fluorescent wheel 40. The diffuser 45 functions to eliminate a speckle phenomenon that may occur, due to the coherent nature of the laser light, by dispersing the light incident on the fluorescent layer 42 of the fluorescent wheel 40.

Accordingly, when the motor 43 of the fluorescent wheel 40 rotates, the rotating substrate 41 is rotated. When the rotating substrate 41 is rotated, the red fluorescent portion 42-1, the green fluorescent portion 42-2, and the transparent portion 42-3, forming the fluorescent layer 42, are rotated so that the light incident on the fluorescent wheel 40 causes one of the fluorescent portions of the wheel 40 to emit fluorescent light or passes through the fluorescent wheel 40.

The light L4, emitted by the red fluorescent portion 42-1 and the green fluorescent portion 42-2 of the fluorescent wheel 40, passes through the second collimator lens 32 and the dichroic mirror 31, and then is transmitted outside the fluorescent unit 30 (see FIG. 3). The light L3 transmitted through the transparent portion 42-3 of the fluorescent wheel 40 is directed along elements of the reflective optical path 35, and then is incident on the dichroic mirror 31. After that, the light L3 is reflected by the rear surface of the dichroic mirror 31 to be transmitted outside the fluorescent unit 30 (see FIG. 2).

The elements of the reflective optical path 35 form a light guide path to guide the light L3, transmitted through the fluorescent wheel 40, to be incident on the dichroic mirror 31. The light incident on the dichroic mirror 31, from the reflective optical path, is transmitted outside the fluorescent unit 30 by the dichroic mirror 31.

The elements of the reflective optical path 35 may include any of a variety of structures as long as they transmits the light L3, transmitted through the transparent portion 42-3 of the fluorescent wheel 40, to be incident on the dichroic mirror 31. Referring to FIG. 2, the elements of reflective optical path 35 of the illumination apparatus 1 according to this exemplary embodiment include a third collimator lens 35-1 for collimating the light L3 transmitted through the fluorescent wheel 40, a first reflective mirror 35-2 for reflecting the light transmitted by the third collimator lens 35-1, a second condenser lens 35-3 for transmitting the light reflected by the first reflective mirror 35-2, a second reflective mirror 35-4 for reflecting the light transmitted by the second condenser lens 35-3, and a third reflective mirror 35-5 for reflecting the light reflected by the second reflective mirror 35-4 toward the dichroic mirror 31. Accordingly, the blue light emitted from the light source unit 10 is transmitted through the transparent portion 42-3 of the fluorescent wheel 40, is incident on the dichroic mirror 31 via the elements of the reflective optical path 35, and then is reflected to the outside of the fluorescent unit 30, as blue light, by the dichroic mirror 31.

The prism unit 50 guides the light transmitted by the fluorescent unit 30 to an image forming unit 60, thereby allowing the image forming unit 60 to form an image by using the light. The prism unit 50 may include an image fly-eye lens 51, a first relay lens 52, a reflective mirror 53, a second relay lens 54, and a total reflection prism 55.

The image fly-eye lens 51 forms the light emitted from the fluorescent unit 30 into a shape corresponding to the shape of the image forming unit 60. The image fly-eye lens 51 consists of a pair of fly-eye lenses. The first relay lens 52 transmits the light from the image fly-eye lens 51 to the reflective mirror 53, and the reflective mirror 53 reflects the light incident from the first relay lens 52. The second relay lens 54 reflects the light from the reflective mirror 53 toward the total reflection prism 55. The first and second relay lenses 52 and 54 may be configured to enlarge or reduce a cross-section of the light transmitted by the image fly-eye lens 51, such that the light transmitted by the first and second relay lenses 52 and 54 has a cross-sectional size corresponding to that of the image forming unit 60.

Figure 6:
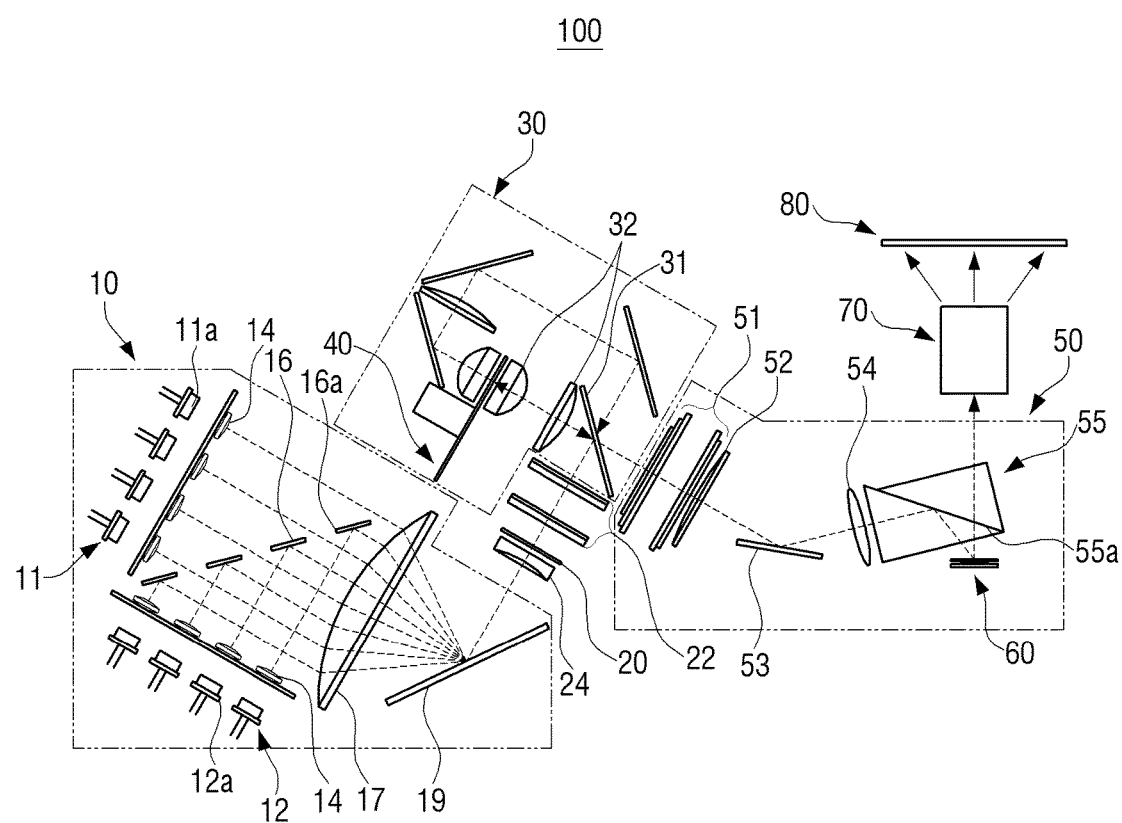
FIG. 6 is a view of a projection-type image display apparatus using the illumination apparatus of FIG. 1.

The total reflection prism 55 is configured and disposed such that a total reflection surface 55a thereof totally internally reflects the light, incident thereon from the second relay lens 54, toward the image forming unit 60 and such that image light reflected from the image forming unit 60 is transmitted through the total reflection prism 55. The image light, transmitted through the total reflection prism 55 is projected onto a screen 80 by a projection unit 70 (see FIG. 6).

Hereinafter, operation of an illumination apparatus 1 according to an exemplary embodiment will be described in detail with reference to the accompanying FIGS. 1 to 3.

Referring to FIG. 1, blue laser light emitted from the light source unit 10 is converted into white light, including blue light, red light, and green light, by the fluorescent unit 30, and then is incident on the prism unit 50. The light incident on the prism unit 50 is guided to the image forming unit 60, and the image forming unit 60 reflects the incident light, thereby emitting image light.

In detail, referring to FIGS. 2 and 3, blue laser light, emitted from the plurality of laser diodes 11a forming the first diode array 11 of the light source unit 10, passes through holes 16a formed in the first mirror 16 and is then incident on the convex lens 17. Also, blue laser light emitted from the plurality of laser diodes 12a, forming the second diode array 12, is reflected by the first mirror 16 to be incident on the convex lens 17. Since a first collimator lens 14 is disposed in front of each of the plurality of laser diodes 11a and 12a of the first and second diode arrays 11 and 12, the collimated light emitted from the laser diodes 11a and 12a becomes more collimated, and is then incident on the first mirror 16.

The light emitted from the plurality of laser diodes 11a and 12a of the first and second diode arrays 11 and 12 is incident on the convex lens 17 and is concentrated. The concentrated is reflected by the second mirror 19 toward the fluorescent unit 30, and may be converted into a single beam by a condenser lens 24, as discussed below.

The diffuser plate 20 and the fly-eye lens 22 are disposed between the second mirror 19 of the light source unit 10 and the dichroic mirror 31 of the fluorescent unit 30. Accordingly, the light L1 emitted from the light source unit 10 is collected by the condenser lens 24 disposed in front of the diffuser plate 20, and then is incident on the diffuser plate 20. The light incident on the diffuser plate 20 is dispersed by the diffuser plate, and thereby is made more uniform (primary uniformization). In other words, since the incident light L1, which is light formed of the light emitted from the plurality of laser diodes 11a and 12a, is dispersed by the diffuser plate 20, the light having passed through the diffuser plate 20 is made more uniform in intensity than the light emitted from the light source unit 10. The light transmitted through the diffuser plate 20 is in a specific form while passing through the fly-eye lens 22, thereby being made more uniform a second time. Accordingly, the light having been transmitted through the diffuser plate 20 and the fly-eye lens 22 has a better uniformity than the light emitted from the light source unit 10.

The light transmitted through the fly-eye lens 22 is incident on the dichroic mirror 31. The dichroic mirror 31 is formed such that blue light is reflected by the dichroic mirror 31 and light of all other colors is transmitted through the dichroic mirror 31. Accordingly, since the light that is incident on the dichroic mirror 31, via the fly-eye lens 22 after being emitted from the light source unit 10, is blue light, the light from the fly-eye lens 22 is reflected by the dichroic mirror 31.

The light L2 reflected from the dichroic mirror 31 is made more collimated by passing through the second collimator lens 32, and then is incident on the fluorescent layer 42 of the fluorescent wheel 40. The light incident on the fluorescent layer 42 of the fluorescent wheel 40 may have a rectangular cross-sectional shape, L as illustrated in FIG. 5. The fluorescent wheel 40 is rotated at a predetermined speed by the motor 43.

Accordingly, if, when the transparent portion 42-3 of the fluorescent layer 42 of the fluorescent wheel 40 is located in the optical path, the blue light L2 which was reflected by the dichroic mirror 31 and transmitted through the second collimator lens 32 reaches the fluorescent wheel 40, the blue light L2 is transmitted through the fluorescent wheel 40 as illustrated in FIG. 2.

The blue light L3 transmitted through the fluorescent wheel 40 is incident onto the first reflective mirror 35-2 via the third collimator lens 35-1. The blue light reflected from the first reflective mirror 35-2 passes through the second condenser lens 35-3, and is then incident on the second reflective mirror 35-4. The blue light reflected by the second reflective mirror 35-4 is incident onto the third reflective mirror 35-5. The third reflective mirror 35-5 reflects the incident blue light toward the dichroic mirror 31. The blue light reflected by the third reflective mirror 35-5 is reflected by the rear surface of the dichroic mirror 31, and is emitted outside the fluorescent unit 30.

Also, if, when the red fluorescent portion 42-1 of the fluorescent layer 42 of the fluorescent wheel 40 is located in the optical path, the blue light L2, which was reflected by the dichroic mirror 31 and transmitted through the second collimator lens 32 reaches the fluorescent wheel 40, the blue light L2 is absorbed by the red fluorescent portion 42-1 of the fluorescent wheel 40 as illustrated in FIG. 3. If the blue light is incident on the red fluorescent portion 42-1, the red fluorescent material of the red fluorescent portion 42-1 is excited to emit red light L4, and then the emitted red light L4 travels toward the second collimator lens 32. The red light L4 having been transmitted through the second collimator lens 32 is incident on the dichroic mirror 31. Since the dichroic mirror 31 transmits all light other than the blue light, the red light L4 is transmitted through the dichroic mirror 31, thereby being emitted outside the fluorescent unit 30.

Also, if, when the green fluorescent portion 42-2 of the fluorescent layer 42 of the fluorescent wheel 40 is located in the optical path, the blue light L2, which was reflected by the dichroic mirror 31 and transmitted through the second collimator lens 32, reaches the fluorescent wheel 40, the blue light L2 is absorbed by the green fluorescent portion 42-2 of the fluorescent wheel 40 as illustrated in FIG. 3. If the blue light is incident on the green fluorescent portion 42-2, the green fluorescent material of the green fluorescent portion 42-1 is excited to emit green light L4, and then the emitted green light L4 travels toward the second collimator lens 32. The green light L4 having been transmitted through the second collimator lens 32 is incident on the dichroic mirror 31. Since the dichroic mirror 31 transmits all light other than the blue light, the green light L4 is transmitted through the dichroic mirror 31, thereby being emitted outside the fluorescent unit 30.

As described above, since the red light, the green light, and the blue light are sequentially emitted by the rotation of the fluorescent wheel 40 of the fluorescent unit 30, and are mixed as described above, the fluorescent unit 30 emits white light.

The light emitted by the fluorescent unit 30 is incident on the image fly-eye lens 51 of the prism unit 50. The light incident on the image fly-eye lens 51 is formed into uniform light with a rectangular cross-sectional shape corresponding to the shape of the image forming unit 60, and is incident on the reflective mirror 53 via the first relay lens 52. The reflective mirror 53 allows the incident light to be incident on the total reflection prism 55 via the second relay lens 54. The light that is incident on the total reflection prism 55 via the first and second relay lenses 52 and 54 is formed to have a cross-sectional shape with a size and a shape corresponding to the image forming unit 60.

The light incident on the total reflection prism 55 is incident on the image forming unit 60 via the total reflection surface 55a of the total reflection prism 55. The image forming unit 60 emits image light using the light incident thereon.

In order to increase the amount of light in the illumination apparatus 1, the uniformity of light incident on the fluorescent wheel 40 of the fluorescent unit 30 may be increased. If the uniformity of the light incident on the fluorescent wheel 40 is low, the light loss increases so that the amount of light is reduced. In an exemplary embodiment described herein, the light emitted from the light source unit 10 is made more uniform first, by the diffuser plate 20, and a second time by the fly-eye lens 22 disposed in front of the dichroic mirror 31. The more uniform light is then is reflected by the dichroic mirror 31 to be incident on the fluorescent wheel 40. Therefore, the uniformity of the light that is incident on the fluorescent wheel 40 is higher when the diffuser plate 20 and the fly-eye lens 22 are used than it would be if the diffuser plate 20 and fly-eye lens 22 were not disposed in front of the dichroic mirror 31.

Hereinafter, a projection-type image display apparatus 100 using the illumination apparatus 1 according to an exemplary embodiment as described above will be described with reference to FIG. 6.

The projection-type image display apparatus 100 may include the illumination apparatus 1, the image forming unit 60, and a projection unit 70.

The illumination apparatus 1 emits blue light using a plurality of laser diodes 11a and 12a, and may include the light source unit 10, the fluorescent unit 30, and the prism unit 50. The structure and operation of the illumination apparatus 1 is described above; and therefore, additional detailed descriptions will be omitted.

The image forming unit 60 outputs image light using the illumination light emitted from the illumination apparatus 1. The image forming unit 60 may be a digital micro-mirror device (DMD) panel including a plurality of micro-mirrors. Each of the micro-mirrors may correspond to a single pixel. Each of the micro-mirrors may be placed in one of an on state and an off state by pivoting in response to the image signal. The image light emitted by the image forming unit 60, by selectively controlling the on and off states of the micro-mirrors, is emitted toward the total reflection prism 55.

The projection unit 70 enlarges and projects the image light, transmitted through the total reflection prism 55 of the prism unit 50, to a screen 80. Although not illustrated in detail, the projection unit 70 may include a plurality of lenses arranged along the light traveling direction and configured to enlarge the projected image. The projection unit 70 may include a projection unit of a known projection-type image display apparatus; therefore, a detailed description thereof will be omitted.

With the illumination apparatus of the projection-type image display apparatus according to an exemplary embodiment described herein, the uniformity of light that is incident on the fluorescent wheel is higher than that of a related art apparatus using the same number of laser diodes. Therefore, the amount of light is increased as compared to the related art illumination apparatus.

With the illumination apparatus according to an exemplary embodiment, since a small fly-eye lens is used to deliver light, emitted from the light source unit, to the fluorescent wheel, there is no need to configure a complex optical structure that uses glass lenses having a high refractive index. Therefore, production of the illumination apparatus is simplified.

While exemplary embodiments have been described herein, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An illumination apparatus comprising:
    a light source unit comprising at least one laser diode;
    a diffuser plate which disperses light emitted from the light source unit;
    a fly-eye lens which transmits light dispersed by the diffuser plate; and
    a fluorescent unit on which light transmitted through the fly-eye lens is incident and which emits white light.

2. The illumination apparatus of claim 1, wherein the light source unit comprises:
    a first diode array comprising a first plurality of laser diodes arranged in a first plane;
    a second diode array comprising a second plurality of laser diodes arranged in a second plane, normal to the first plane;
    a first mirror disposed between the first diode array and the second diode array, wherein the first mirror transmits light emitted from the first diode array and reflects light emitted from the second diode array;
    a convex lens which transmits light from the first mirror; and
    a second mirror which reflects light, incident thereon from the convex lens, toward the diffuser plate.

3. The image forming apparatus of claim 2, further comprising:
    a plurality of first collimator lenses, wherein each of the plurality of first collimator lenses is disposed in front one of each of the first plurality of laser diodes and the second plurality of laser diodes.

4. The image forming apparatus of claim 2, wherein each of the plurality of laser diodes comprises a blue laser diode.

5. The image forming apparatus of claim 1, wherein the diffuser plate comprises a glass diffuser plate.

6. The image forming apparatus of claim 1, wherein the fluorescent unit comprises:
    a dichroic mirror comprising a first surface which reflects light transmitted through the fly-eye lens;
    a collimator lens which collimates light reflected by the dichroic mirror;
    a fluorescent wheel rotatably disposed in an optical path of light transmitted through the collimator lens is incident on the fluorescent wheel, wherein depending on a rotational position of the fluorescent wheel, the fluorescent wheel transmits light transmitted through the second collimator lens or absorbs light transmitted through the second collimator lens and emits fluorescent light; and
    a reflective optical path comprising at least one optical element configured to guide light transmitted through the fluorescent wheel to a second surface of the dichroic mirror.

7. The image forming apparatus of claim 6, wherein the fluorescent wheel comprises:
    a disk-shaped rotating substrate;
    a fluorescent layer disposed on one surface of the disk-shaped rotating substrate; and
    a motor configured to rotate the disk-shaped rotating substrate,
    wherein the fluorescent reflection layer includes a red fluorescent portion, a green fluorescent portion, and a transparent portion arranged in a circumferential direction on the disk-shaped rotating substrate, and
    wherein light emitted by the red fluorescent portion and light emitted by the green fluorescent portion is transmitted through the collimator lens, is transmitted through the dichroic mirror, and is emitted to an outside of the fluorescent unit, and light transmitted through the transparent portion is transmitted through the reflective optical path and then is reflected to the outside of the fluorescent unit by the dichroic mirror.

8. The illumination apparatus of claim 7, further comprising a fluorescent diffuser disposed on the fluorescent reflection layer of the fluorescent wheel.

9. The illumination apparatus of claim 6, wherein the reflective optical path comprises
    a collimator lens which collimates light transmitted through the fluorescent wheel;
    a first reflective mirror which reflects light transmitted through the collimator lens;
    a condenser lens which transmits light reflected from the first reflective mirror;
    a second reflective mirror which reflects light transmitted through the condenser lens; and a third reflective mirror which reflects, toward the dichroic mirror, light reflected by the second reflective mirror.

10. The illumination apparatus of claim 1, further comprising:
a prism unit which guides light, emitted by the fluorescent unit, toward an image forming unit, wherein the prism unit comprises:
an image fly-eye lens which transmits light, emitted by the fluorescent unit, toward the image forming unit, wherein light transmitted by the image fly-eye lens has a cross-sectional shape which corresponds to a shape of the image forming unit;
a first relay lens which transmits light transmitted by the image fly-eye lens;
a reflective mirror which reflects light transmitted by the first relay lens;
a second relay lens which transmits light reflected by the reflective mirror; and
a total reflection prism which totally internally reflects light, transmitted through the second relay lens, toward the image forming unit,
wherein light reflected by the image forming unit is incident on and transmitted through the total reflection prism.

11. A projection-type image display apparatus comprising:
an illumination apparatus configured to emit laser light;
a prism unit configured to guide light from the illumination apparatus to an image forming unit;
the image forming unit, configured to emit image light; and
a projection unit configured to project the image light, emitted by the image forming unit, onto a screen,
wherein the illumination apparatus comprises:
a light source unit comprising at least one laser diode;
a diffuser plate which disperses light emitted from the light source unit;
a fly-eye lens which transmits light dispersed by the diffuser plate; and
a fluorescent unit on which light transmitted by the fly-eye lens is incident and which emits white light; and
a prism unit which guides light emitted by fluorescent unit toward an image forming unit, wherein the prism unit comprises,
an image fly-eye lens which transmits light, emitted by the fluorescent unit, toward the image forming unit, wherein light transmitted by the image fly-eye lens has a cross-sectional shape which corresponds to a shape of the image forming unit;
a first relay lens which transmits light transmitted by the image fly-eye lens;
a reflective mirror which reflects light transmitted through the first relay lens;
a second relay lens which transmits light reflected by the reflective mirror; and
a total reflection prism which totally internally reflects light, transmitted through the second relay lens, toward to the image forming unit,
wherein light reflected by the image forming unit incident on and transmitted through the total reflection prism.

* * * * *